E. WILCOX.
HARVESTER-RAKE.

No. 175,315.          Patented March 28, 1876.

WITNESSES

INVENTOR
Elihu Wilcox.
By his Attorney

UNITED STATES PATENT OFFICE.

ELIHU WILCOX, OF BROCKPORT, NEW YORK, ASSIGNOR TO DAYTON S. MORGAN, OF SAME PLACE.

IMPROVEMENT IN HARVESTER-RAKES.

Specification forming part of Letters Patent No. 175,315, dated March 28, 1876; application filed February 12, 1876.

*To all whom it may concern:*

Be it known that I, ELIHU WILCOX, of Brockport, Monroe county, New York, have invented a new and useful Improvement in Harvester-Rakes, of which the following is a specification:

My invention relates to that class known as vibrating sweep-rakes, and constitutes an improvement upon the machine shown in Letters Patent No. 135,731, granted February 11, 1873, to Seymour & Morgan.

The object of my invention is to hold the rake down upon the platform when raking off with an elastic pressure, which end I attain by mounting a spring on the rake-stale, which moves endwise with it, and serves as a guide to preserve the proper relation between the rake-stale and the pivot on which it slides.

Figure 1:
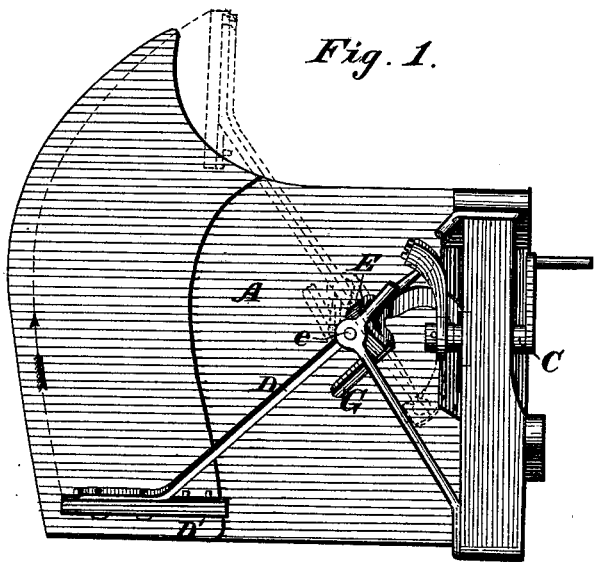
Figure 2:
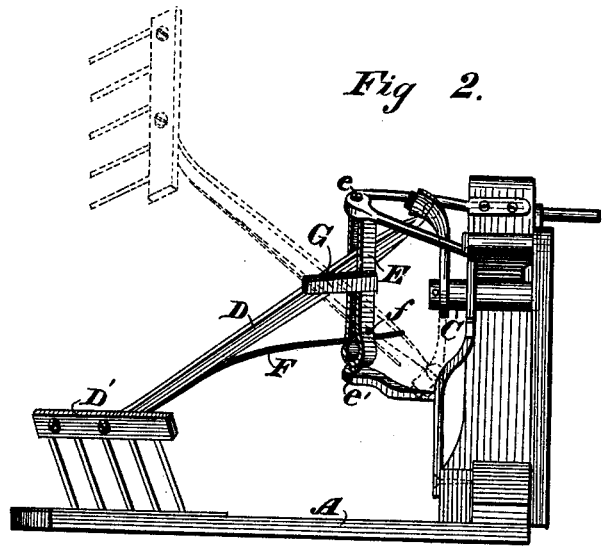

In the accompanying drawings, Figure 1 shows a plan view, and Fig. 2 a front elevation of so much of the apparatus as is necessary to illustrate the invention herein claimed.

The rake-supporting frame B is mounted upon a platform, A, or upon the main frame, as may be preferred. A crank-shaft, C, driven in any usual well-known way, is connected by a ball-and-socket joint with a rake-stale, D, carrying a rake-head, D', and movable endwise through a frame, E, rocking on pivots *e*.

A plate-spring, F, on the under side of the rake-stale, passes through the slotted rocking frame underneath a transverse pin, *f*.

The full lines in the drawing show the rake as just beginning its backward stroke, in which position it will be observed the rake-stale is elevated to the upper part of the turning-frame, while the rake-head is held down by the spring bearing on the pin.

The dotted lines show the rake as elevated preparatory to moving forward to commence a new stroke, in which position the rake-stale rests upon the pin *f*, and the spring acts as a guide, and prevents it from wabbling.

The arm G on the turning-frame represents the connection with the vibrating reel, shown in the patent of Seymour & Morgan above mentioned.

I claim as of my own invention—

In combination with the rocking frame, the rake-stale, with a plate-spring mounted thereon, and both movable endwise through the rocking frame, substantially as set forth.

In testimony whereof I have hereunto subscribed my name.

ELIHU WILCOX.

Witnesses:
  E. T. LAMB,
  JOHN H. KINGSBURY.